United States Patent

[11] 3,617,298

| [72] | Inventor | Otto A. Kohl |
| | | 2222 1st. Ave., Cedar Rapids, Iowa 52405 |
| [21] | Appl. No. | 826,822 |
| [22] | Filed | May 22, 1969 |
| [45] | Patented | Nov. 2, 1971 |
| | | Continuation-in-part of application Ser. No. 636,661, May 8, 1967, now abandoned. |

[54] ANIMAL FEED
12 Claims, 2 Drawing Figs.

[52] U.S. Cl. .................................................. 99/2, 99/6, 99/166
[51] Int. Cl. ............................................. A23k 1/00, A23k 1/02
[50] Field of Search ................................. 99/2, 2 N, 2 I, 6, 166; 71/62, 64 E, 64 G

[56] References Cited
UNITED STATES PATENTS

| 2,351,071 | 6/1944 | Schmidt ................. | 99/6 |
| 2,965,488 | 12/1960 | Belasco .................. | 99/2 |
| 3,143,410 | 8/1964 | Smith ..................... | 71/64 |
| 3,413,118 | 11/1968 | Kviesitis ................. | 99/6 |

Primary Examiner—Norman Yudkoff
Assistant Examiner—Curtis P. Ribando
Attorney—Hill, Sherman, Meroni, Gross and Simpson ABSTRACT: A method of producing an animal feed supplement comprising, mixing moisture-free nitrogeneous source material particles (i.e., urea) with moisture-free fine sized diatomaceous earth particles until each protein material particle is coated with diatomaceous earth particles and then mixing a liquified palate-inducing material (i.e., molasses) with these particles until a three-layered particle is produced and then drying such three-layered particles until they have a glazed spheroidal surface that is nonhydroscopic and anticaking. The finished product is then either classified with the rejects being recycled and the other portions being packaged or it may be packaged directly. Included are the finished feed supplement particles per se and a method of retarding release of nitrogen in ruminants by feeding them the instant feed supplement.

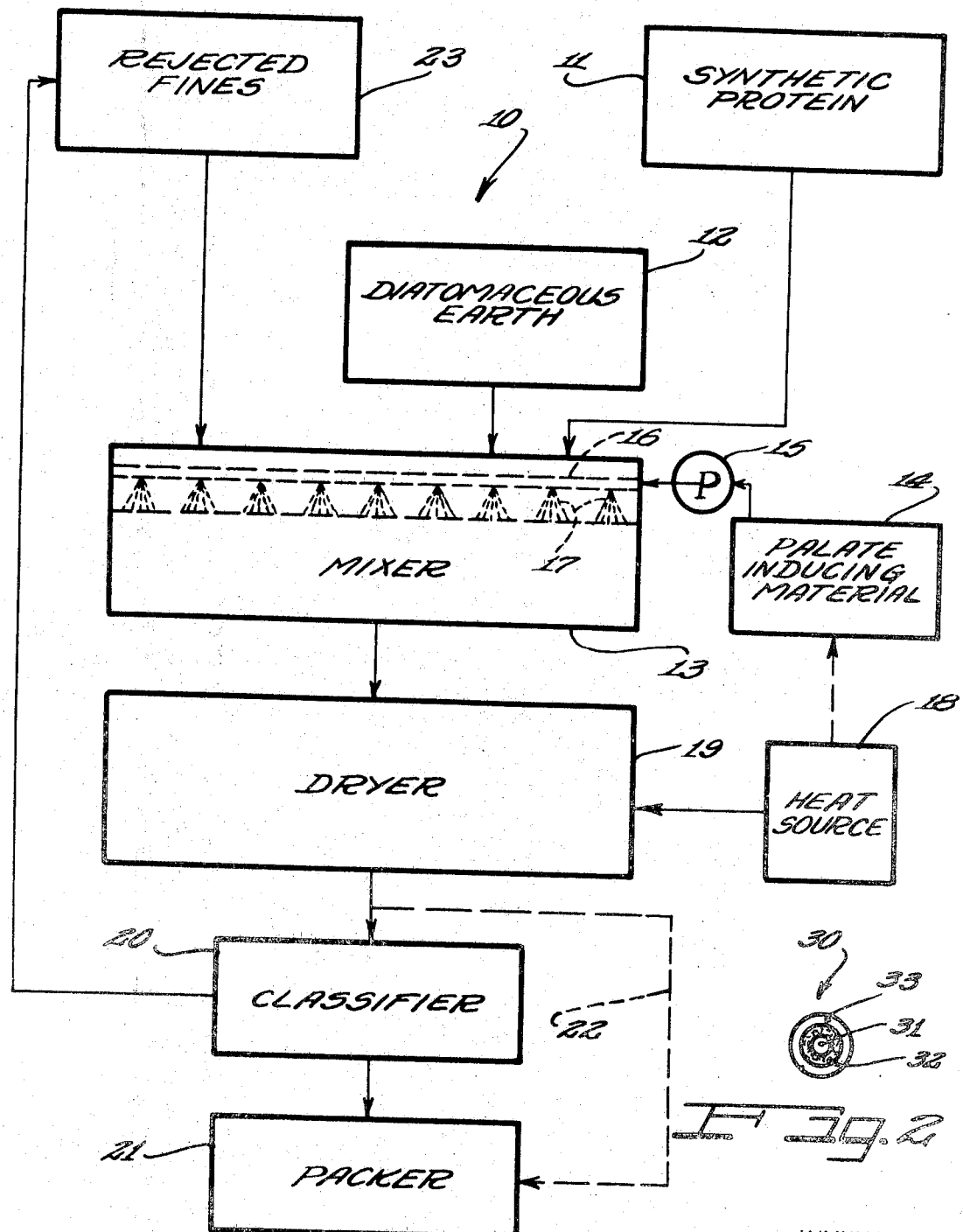

ANIMAL FEED

This is a continuation-in-part application of my copending U.S. Ser. No. 636,661, filed May 8, 1967, now abandoned.

The invention relates in general to animal feeds and more particularly to a method of producing a novel animal feed supplement, the feed supplement per se and the method of utilizing such feed supplement.

The economic growth of various livestock, including ruminants (cattle, sheep, goats, etc.) requires that they be fed a high protein source of food so that they mature to marketable size as soon as possible. Many various animal feeds and feed supplements are known which attempt to produce optimum growth. However, such known materials are either noneconomical or fail to achieve desired results.

Accordingly, it is an important object of the invention to provide a method of formulating or producing a feed supplement that enhances the growth rate of livestock.

It is another important object of my invention to provide a method of producing a novel feed supplement utilizing crude nitrogeneous source materials combined with various other ingredients which are readily available and produce beneficial results in the livestock.

It is another object of the invention to provide a novel food supplement wherein the nitrogeneous source material is coated with diatomaceous earth and then with a palate-inducing material thereby retarding the release of nitrogen within the livestock.

Other objects, features and advantages of the invention will become more apparent from the following detailed description of certain preferred embodiments thereof, taken in conjunction with the accompanying drawing, although variations and modifications may be effected without departing from the spirit and scope of the novel concepts of the disclosure, and in which:

FIG. 1 illustrates a flow diagram of the instant process, with an alternative method shown in dotted lines; and FIG. 2 is a somewhat schematic elevational view, greatly enlarged, showing a particle of the food supplement of the invention.

Various nitrogeneous source materials are available in many forms, for example, urea is commercially available in liquids, prilled or granulated form. The liquid form must be maintained under temperature and pressure conditions that exclude its use by conventional feeders or feed manufacturers since it requires investment in exceptionally costly equipment. Further, only with such equipment is it possible to utilize liquid urea at concentrations higher than about 32 percent. In the prilled or granulated form, urea is hydroscopic, difficult to handle, bitter tasting, and often segregates in finished formulations. Further, solidified urea is quite toxic if fed in excess. The bitter taste of urea (or other nitrogeneous source materials) is quite offensive to livestock and often causes a backup in intake of mixed feed rations, causing the livestock to go "off feed". Further, the segregation of the dried prills in mixed feeds causes a concentration within the feeds resulting in an overdose. Toxicity is to be expected and often death results before the animals involved can be properly treated. Nevertheless, urea and other nitrogeneous source materials remain an economically attractive source of, for example, nitrogen, that is necessary for the proper growth of the livestock.

The instant invention contemplates utilizing various nitrogeneous source materials such as urea, biuret, diammonium phosphate, triammonium phosphate, mixtures thereof, etc., in a particulated relatively moisture-free (i.e., less than about 1 percent of water) form, such as for example, prilled urea which is available containing less than about 0.1 percent water. As indicated hereinbefore, a concentration of nitrogeneous source material as, for example, urea, tend to be toxic to animals and it is generally considered that only about 33-⅓ of crude protein should be provided in the form of nitrogeneous source material with the remaining amount of protein, i.e., 66-⅔ percent being in the form of a natural protein, such as alfalfa, grain, etc. However, with the instant feed supplement produced in accordance with the principles of the invention, it is possible to provide 60 percent and possibly higher percentages up to 90 percent of artificial or nitrogeneous source material i.e., urea, with the remainder of the feed being made up of natural proteins. The preferred nitrogeneous source material is urea, biuret, diammonium phosphate, triammonium phosphate and mixtures thereof containing less than about 1 percent moisture. Within this group the preferred material is urea in prill form having less than 0.01 percent moisture and passing through a 20-mesh screen but retained on a 60-mesh screen.

The relatively moisture-free nitrogeneous source particles are then coated with finely divided natural diatomaceous earth particles. The diatomaceous earth is likewise moisture-free and consists of only about 10 percent solids with about 90 percent voids. Diatomaceous earth material is very economical and readily available and does not have to be processed or calcinated after being mined. Generally, it is sufficient that the diatomaceous earth be simply dried to a low moisture content i.e., below about 1 percent by weight) and air classified to a fine particle size so that at least about 90 percent will pass through a standard 325-mesh screen. A will be appreciated, this is an extremely fine particle size generally in the neighborhood of about 44 microns. Larger sized particles do not produce adequate results in that they are unable to adequately coat the nitrogeneous source material in the manner desired. For example, expanded vermiculite which exists at relatively large particle sizes does not produce desirable results.

The relatively fine sized moisture-free diatomaceous earth particles are then mixed or blended with the moisture-free nitrogeneous source particles until the diatomaceous earth particles substantially coat each of the nitrogeneous source particles. The coating action proceeds from the mechanical interlocking of the diatomaceous earth particles onto the nitrogeneous source particles. As will be appreciated, diatomaceous earth particles have a plurality of spikelike projections therefrom enhancing their ability to adhere or stick to various other materials without the need of any adhesive or bonding agent, such as moisture. These two materials are blended and/or otherwise vigorously mixed to produce an intimate blend thereof whereby all of the particles of, for example, urea, are coated with substantial quantities of diatomaceous earth particles. Generally, when a paddle type blender intimate mixer is utilized to obtain the mixing, a period of time of about 2 minutes is required to attain the proper coating of the nitrogeneous source particles with the diatomaceous earth particles. However, as will be appreciated, the time period depends upon the quantity of material being processed and the type of equipment being utilized.

After an intimate mixture of diatomaceous earth particles and the nitrogeneous source particles is attained as set forth hereinabove, a liquified palate-inducing material is mixed with these particles to produce an outer coating of such palate-inducing materials on the diatomaceous earth-coated nitrogeneous source particles.

The palate-inducing material is preferably a sugar-containing product or byproduct such as black-strap molasses, corn molasses, beet molasses, corn sugar, masonite material, etc. The preferred palate-inducing material is molasses of any weight, particularly heavy molasses or high-brix molasses since this material is easier to dry and results in less shrinkage. Further, high-brix molasses has a greater percentage of solids than does standard molasses and an 86-brix molasses is an exceptionally well suited material. The palate-inducing material may be liquified in any manner suitable for ease of mixing with the dry particulate materials. This liquification may occur by heating the palate-inducing material or by incorporating a surfactant therein, such as propylene glycol, although other surfactants may also be utilized. If heat is utilized to maintain the palate-inducing material in a liquified condition, the temperature must be maintained high enough to permit ease of flow but low enough to prevent carmelization thereof. Generally, a temperature in the range of about 90° to 120° F. is preferred when molasses are utilized as the palate-inducing material. Below this temperature range, molasses are difficult to pump and mix with the dried particulate material and above this temperature range, the danger of carmelization becomes prohibited. Carmelized molasses are extremely viscous and clog the processing equipment thereby requiring a complete shut down and clean out which is time consuming.

The mixing and/or blending of the palate-inducing material with the diatomaceous-earth coated nitrogeneous source material particles is continued until a substantially uniform coat of the palate-inducing material is attained on the outer surface of such coated protein material particles. Thereafter, the three-layered particles (the center portion being nitrogeneous source material, the intermediate portion being diatomaceous earth and the outer portion being palate-inducing material) are subjected to drying conditions sufficient to produce a plurality of product particles which have a glazed, relatively hard, somewhat spheroidal surface, and the particles are free-flowing, noncaking, nonhydroscopic and stable over a wide range of temperature and atmosphere conditions. These drying conditions are preferably achieved by the use of a stream of heated air flowing past the coated particles causing continual movement within the particles sufficient to glaze the palate-inducing material at the outer surface but insufficient to adversely effect the synthetic protein material. Thus, the dry bulb temperature at the outlet of the heated air stream preferably does not exceed about 150° F. Adequate air exhaust movement is supplied during the glazing and/or drying step to prevent a long retention time of the coated nitrogeneous source materials at elevated temperatures since such elevated temperatures are somewhat detrimental to the nitrogeneous source material. Adverse heat effect on the nitrogeneous source material can be readily detected by a distinct ammonia odor at an exhaust and means may be provided for detecting such ammonia odor and thereby selectively regulating the temperature of the drying operation. The product particle may then be directly packaged into suitably sized containers, which are preferably moisture-free. Alternatively, the product particles may be screened into various sizes and the rejects recycled for further mixing with fresh material while the acceptable sized product particles may be packaged as above.

The finished food supplement product particle thus comprises a plurality of glazed, somewhat spheroidal, free-flowing, anticaking stable three-layered particles, each of the particles having an inner nitrogeneous source material portion, an intermediate diatomaceous earth portion and an outer palate-inducing material portion. The weight ratio of nitrogeneous source material to diatomaceous earth particles ranges from about 1:1 to about 3:1, and the weight ratio of the palate-inducing material to the diatomaceous earth particles ranges from about 1:1 to about 3:1. It will thus be seen that the food supplement of the invention provides an exceptionally high degree of nitrogen suitable for feed to ruminants. Further, the two layers of coating provided on the nitrogen containing nitrogeneous source material (i.e., urea, biuret, etc.) retards the release of such nitrogen in ruminants so that substantially higher portions thereof may be fed to ruminants without the danger of overdosing or poisoning the ruminants.

The process of the invention is generally illustrated at 10 wherein a supply 11 of relatively moisture-free nitrogeneous source is controllably fed to a mixer 13. A supply 12 of relatively moisture-free finely divided diatomaceous earth particles is likewise provided and likewise controllably fed to the mixer 13. Preferably, the mixer 13 is of the paddle type wherein particulate material is continually circulated throughout a chamber. The mixer 13 blends or mixes the dried particulate diatomaceous earth and nitrogeneous source material to cause an intimate blending thereof. The two dried solids are continually mixed or blended in this fashion until all of the nitrogeneous source material is coated with substantial quantities of diatomaceous earth particles. The mixer 13 is also provided with a means 16 allowing the mixing of a liquified material with the dried solids. Preferably, means 16 is a pipe having a plurality of jets 17 allowing the liquid to be sprayed into the solid mixture. A liquified palate-inducing material is provided from a supply 14 therefor via a pressure pump 15 into means 16 to be sprayed into the dried mixture within the mixer 13. As will be appreciated, a controlled amount of palate-inducing material is fed into the mixer 13. The mixer 13 continues to blend the liquified palate-inducing material and the dried solids until an outer coating of the palate-inducing material is attained on the diatomaceous earth-coated nitrogeneous source particles. Where, for example, molasses are utilized as the palate-inducing material, a readily ascertainable means of determining the degree of mixture or blending occurring may be to note the color of the overall mixture. As will be appreciated, molasses is normally dark brown in color, while diatomaceous earth particles are somewhat whitish. In general, a batch of food supplement of the invention is properly mixed and then the mixture changes from a white powdery solid dusty material to a semidry particulate material approaching the color of the palate-inducing material, in this example a light brown color. At this point, the diatomaceous earth-coated nitrogeneous source material (urea) is coated and is ready for further processing. In the semidried form, removal of the particles from the mixer is somewhat difficult and they may be transported to an appropriate drier by means of a belt conveyor or a bucket elevator or some other such conveying means suitable for a semidried material.

A drier 19 is provided to receive the semidried palate-inducing coated particles. The drier 19 is preferably a direct fired horizontal rotary drum type, however, other suitable low-temperature drying equipment may also be utilized. A heat source 18 is provided in direct communication with the drier 19 and, if desired, the heat source may also communicate with the palate-inducing material to maintain it in a liquified state as explained hereinbefore. In accordance with the principles of the invention, actual drying is kept to the minimum and the change which occurs within the drier 19 is more in the nature of a glazing operation, which hardens the protective coating of the palate-inducing material and, by virtue of the circulation within the drier produces a spheroidal outer surface which is relatively hard, free-flowing, noncaking and relatively nonhydroscopic.

After the drier, the product particles may proceed to a classifier 20 or alternatively, via means 22 to a packer 21. When a classifier is utilized, the product particles as classified into various size groups and the rejected sizes, i.e., generally fines passing through about a 100 mesh screen, are recycled to a rejected fines container 23 and then to the mixer 13 for further processing. The accepted size product particles pass from the classifier to the packer 21 wherein the product particles are packaged in suitably sized substantially moistureproof containers for shipment and the like to various locations. As will be appreciated, oversized product particles may also be removed for reparticulization and recycling.

The potential protein (i.e. the available nitrogen) amount in the product particles of course depends upon the ratio of, for example, urea, to diatomaceous earth. However, it is also somewhat controlled by the drying or glazing process. When the semidry palate-inducing coated particles are insufficiently dried, excessive fines will be drawn off from the drier via the stream of heated air causing a poor coating and a higher protein level in the finished product. On the other hand, if excessive drying of the semidry particles takes place, then "balling" or particle conglomeration results causing a poor coating and a rise in the protein level of the finished product. Thus sufficient attention must be given during the mixing/blending and drying/glazing steps to avoid such occurrences. Further retention time of the particles in the drying drum must also be carefully controlled to avoid separating the coatings from the nitrogeneous source particles, i.e., urea prills. As will be appreciated, all or almost all of the protein in the feed supplement of the invention is derived from the nitrogeneous source materials any any waste, such as decomposition of such nitrogeneous source materials results in economic losses. Further, any excessive shrinkage of, for example, the outer palate-inducing coating raises the potential protein concentration in the finished product. Thus, the potential protein concentration in the product of the invention is adjustable and controllable by the various methods set forth above.

FIG. 2 illustrates, in somewhat exaggerated schematical form, a single product particle 30 produced in accordance with the principles of the invention. A centralized nitrogeneous source material particle 31, for example a prill of urea or biuret is provided with an intermediate layer of a plurality of diatomaceous earth particles 32 and thereafter coated with a relatively hard palate-inducing material 33, i.e., glazed molasses. A plurality of such product particles are glazed, somewhat spheroidal, free-flowing, anticaking and stable over a wide variety of temperature and atmosphere conditions thereby suitable for long periods of storage and/or immediate use with or without the addition of other natural protein sources. The finished product particles contain less than about 3 percent moisture and are nonhydroscopic allowing mixture thereof with various minerals and vitamins and/or other natural protein sources without encountering processing difficulties requiring expensive equipment.

In summation, it will be seen that the invention provides a novel method of producing an animal feed supplement comprising mixing relatively moisture-free particles of nitrogeneous source materials with finely divided relatively moisture-free diatomaceous earth particles until such nitrogeneous source particles are coated with a plurality of diatomaceous earth particles producing a plurality of diatomaceous earth-coated protein particles; and thereafter mixing a liquified palate-inducing material with the diatomaceous earth-coated nitrogeneous source particles until coated particles are coated with the palate-inducing material to produce a plurality of three-layered particles, and then subjecting the three-layered particles to drying conditions sufficient to produce a plurality of glazed, somewhat spheroidal free-flowing, anticaking, nonhydroscopic product particles. The feed supplement product particles contain an exceptionally high percentage of nitrogen which is slowly released in a ruminant and therefore does not cause toxicity to the ruminant, is highly palatable to a ruminant since it contains between 50 to 90 percent of palate-inducing material, i.e., molasses and it can be readily utilized by relatively unskilled feeders without the necessity of obtaining expensive equipment or having specialized knowledge.

I claim as my invention:

1. A method of producing an animal food supplement comprising the steps of (a) mixing relatively moisture-free particulate nitrogeneous source material selected from the group consisting essentially of urea, biuret, diammonium phosphate, triammonium phosphate and mixtures thereof with finely divided relatively moisture-free diatomaceous earth particles until each of the nitrogenacious source material particles is coated with diatomaceous earth particles to produce a plurality of diatomaceous earth-coated nitrogeneous source particles, (b) mixing a liquefied sugar-containing material with said diatomaceous earth-coated nitrogeneous source particles until said coated particles are coated with a layer of sugar-containing material to produce a plurality of three-layered particles, each having a centralized nitrogeneous source portion, an intermediate diatomaceous earth portion and an outer sugar-containing portion, and (c) subjecting said three-layered particles to drying conditions sufficient to produce a plurality of glazed somewhat spheroidal free-flowing anticaking nonhydroscopic animal food supplement particles.

2. The method as defined in claim 1, wherein at least 90 percent of the diatomaceous earth particles pass through a 325 mesh screen.

3. The method as defined in claim 1, wherein the sugar-containing material is selected from the group consisting of black-strap molasses, corn molasses, beet molasses, masonite material and mixtures thereof.

4. The method as defined in claim 1, wherein the weight ratio of nitrogeneous source material to diatomaceous earth particles ranges from about 1:1 to about 3:1 and the weight ratio of the sugar-containing material to the diatomaceous earth particles ranges from about 1:1 to about 3:1.

5. The method as defined in claim 1, wherein a surfactant is added to the sugar-containing material to aid liquification of said sugar-containing material and its adsorption on the diatomaceous earth-coated protein particles.

6. A method of producing an animal food supplement comprising the steps of (a) mixing relatively moisture free discrete particles of a nitrogeneous source material selected from the group consisting essentially of urea, biuret, diammonium phosphate, triammonium phosphate and mixtures thereof with relatively moisture free diatomaceous earth particles of a size at least 90 percent of which pass through a 325 mesh screen until each of the nitrogeneous source material particles are substantially uniformly coated with a plurality of diatomaceous earth particles to produce a plurality of diatomaceous earth-coated nitrogeneous source particles, the ratio of nitrogeneous source material to the diatomaceous earth particles being in the range of about 1:1 to 3:1; (b) spraying a predetermined amount of a liquefied sugar-containing material into the diatomaceous earth-coated nitrogeneous source particles, the weight ratio of the sugar-containing material to diatomaceous earth particles being in the range of about 1:1 to about 3:1; (c) continuously mixing the resultant material mixture until each of the diatomaceous earth-coated nitrogeneous source particles have an outer coating of sugar-containing material thereon to produce a plurality of three-layered particles, each having a centralized nitrogeneous source portion, an intermediate diatomaceous earth portion and an outer sugar-containing portion; and (d) subjecting said three-layered particles to drying conditions sufficient to produce a plurality of glazed somewhat spheroidal free-flowing anticaking nonhydroscopic animal food supplement particles but insufficient to adversely effect the nitrogeneous source material.

7. The method as defined in claim 6, wherein step (5) comprises moving a stream of heated air at an outlet dry bulb temperature below about 150° F. through the three-layered particles.

8. The method as defined in claim 6, wherein the sugar-containing material is liquified by the controlled application of heat in the range of about 90° to 120° F.

9. The method as defined in claim 6, wherein the particles of nitrogeneous source material and the particles of diatomaceous earth contain less than about 1 percent by weight moisture 10. A food supplement for animals comprising a plurality of glazed somewhat spheroidal free-flowing anticaking three-layered particles, each of said particles having an inner nitrogeneous source material selected from the group consisting essentially of urea, biuret, diammonium phosphate, triammonium phosphate and mixtures thereof, an intermediate diatomaceous earth material portion and an outer sugar containing material portion.

11. A food supplement for animals as defined in claim 10 wherein the weight ratio of the nitrogeneous source material to the diatomaceous earth material ranges from about 1:1 to about 3:1 and the weight ratio of the sugar-containing material to the diatomaceous earth material ranges from about 1:1 to about 3:1.

12. A food supplement for animals as defined in claim 10 wherein the sugar-containing material is selected from the group consisting essentially of black-strap molasses, corn molasses, beet molasses, masonite material and mixtures thereof.

* * * * *